(12) United States Patent
Alexandre et al.

(10) Patent No.: US 6,212,233 B1
(45) Date of Patent: Apr. 3, 2001

(54) VARIABLE BIT-RATE ENCODER

(75) Inventors: Patrice Alexandre, Cesson-Sévigné; Claude Perron, Betton; Ludovic Noblet, Heric, all of (FR)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/180,255

(22) PCT Filed: May 7, 1997

(86) PCT No.: PCT/FR97/00820

§ 371 Date: Nov. 6, 1998

§ 102(e) Date: Nov. 6, 1998

(87) PCT Pub. No.: WO97/43859

PCT Pub. Date: Nov. 20, 1997

(30) Foreign Application Priority Data

May 9, 1996 (FR) .................................. 96 05766

(51) Int. Cl.⁷ ..................................................... H04N 7/12
(52) U.S. Cl. .......................................................... 375/240.03
(58) Field of Search ..................... 348/419, 405, 348/240.23; 375/240

(56) References Cited

U.S. PATENT DOCUMENTS

| | | | |
|---|---|---|---|
| 5,136,376 | * 8/1992 | Yagasaki et al. | 375/240.23 |
| 5,333,012 | * 7/1994 | Singhal et al. | 348/405 |
| 5,739,863 | * 4/1998 | Ohtsuki | 348/405 |

FOREIGN PATENT DOCUMENTS

| | | |
|---|---|---|
| 0478230 | 4/1992 | (EP) . |
| 0515101 | 5/1992 | (EP) . |
| 0540961 | 10/1992 | (EP) . |
| 0595268 | 5/1994 | (EP) . |
| 0689360 | 6/1995 | (EP) . |
| 670663 | 9/1995 | (EP) ........................... H04N/7/50 |
| 0708566 | 4/1996 | (EP) . |
| WO95/26111 | 9/1995 | (WO) . |
| 96/20575 | 7/1996 | (WO) . |

OTHER PUBLICATIONS

IEEE Transactions on Circuits and Systems for Video Technology, vol. 2, No. 4, Dec. 1, 1992, A.R. Reibman et al. "Constraints on Variable Bit–Rate Video for ATM Networks", pp. 361–372.

Discovering a New World of Communications Chicago, Jun. 14–18, 1992, Institute of Electrical and Electronics Engineers, vol. 1 of 4, Jun. 14, 1992, R.C. Lau et al. "Receiver Buffer Control for Variable Bit–Rate Real–Time Video", pp. 544–550.

* cited by examiner

Primary Examiner—Chris Kelley
Assistant Examiner—Allen Wong
(74) Attorney, Agent, or Firm—Joseph S. Tripoli; Ronald H. Kurdyla

(57) ABSTRACT

The invention relates to a process for coding digital data of a video sequence for its transmission and a variable bit rate.

It is characterized in that the bit rate regulation in respect of the image at the instant n is performed as a function of a bit rate prediction in respect of the transmission channel for the instant n+τ, τ being a constant time between the instant of storage of an image in the buffer of the coder and the instant of output of this image from the buffer of the decoder.

11 Claims, 6 Drawing Sheets

VARIABLE BIT-RATE ENCODER

The invention relates to the coding of audio, video or auxiliary digital data.

It relates more particularly to systems for variable bit rate transmission and for storage which utilize compression of audio and video digital data. It is compatible with the MPEG 2 standard.

The role of video compression systems is to obtain the best image quality for as low a transmission bit rate as possible. This quality of coding is related among other things to the choice of the motion estimator and of the coder regulating algorithm. It depends directly on the optimality criteria adopted.

In respect of motion estimation, the capacity for searching in the reference image is an important characteristic. In respect of regulation, the major objective is to maintain stable quality of the coded images. The "padding" factor employed in order to adjust the coding to the output bit rate (in general an insertion of "0" into the data stream making it possible to preserve the bit rate setting) must be minimized for optimal coding.

The cost of coding each image is variable. It is the role of the regulating loop to correct the flow variations due to the variations in the complexity of the image (defined hereafter) and to transmit as output a data flow corresponding to a data rate setting. This regulation generally acts on the quantization interval which is dependent on the fill level of the buffer memory. This buffer memory at the output of the coder makes it possible to absorb the deviations in bit rate which are due to the response time of the regulating loop, and to which the capacity of the buffer is related.

The data flow at the output of a coder of a video source can be variable. It may indeed be beneficial, for example in the case of transmitting several video sources over a single channel, to distribute the available "global" bit rate of this channel between the various sources dynamically, that is to say as a function of the change in the complexity of the images to be coded from each video source. This process makes it possible to improve the global quality of the transmitted images, relative to existing processes, for example those which assign a bit rate to the video sources as a function of the type of programme transmitted.

FIG. 1 represents a set of a transmission using such a process. This involves transmitting from several coded video sources over a single transmission channel with a constant global bit rate. This bit rate corresponds to its capacity, for example that of the channel of a transponder. The coding circuits of the video sources 13*i* are linked to the input of a multiplexer 11 whose output supplies the data stream to be transmitted over the channel. They are also linked to an interface circuit 14 which transmits the data relating to the complexity of the video sources to a bit rate allocator 12 and receives the bit rates allotted to each source by this bit rate allocator 12. The latter, whose role is therefore to allocate a bit rate to each source 13*i*, controls the multiplexing circuit or multiplexer 11. The information is exchanged by way of a fast bus hooked up to the bit rate allocator 12 and the interface circuit 14. A supervisory circuit 15 is linked to this bus to manage the transmission set.

Multiplexing is performed for example at a GOP speed, the GOP being an image group defined hereafter, as a function of the bit rate allocated by the bit rate allocator to each video source transmitted over the same channel. This bit rate depends on a coefficient of complexity of the video source which takes into account the volume of information generated for a given quantization interval. This coefficient is measured for each GOP of each video source. It corresponds for example to the number of bits used to code a GOP, the quantization interval being constant or alternatively to a standardized counting of bits corresponding to the number of bits multiplied by the quantization interval if this step is variable. Since the flow is constant over the duration of a GOP, the output buffer of the corresponding source must absorb the bit rate spikes over the duration of a GOP.

The utilization of variable bit rate encoders associated with statistical multiplexing which depends on the bit rate of each source, as described above, is known and is a means of optimizing the capacity of the transponder channel. The drawbacks of these regulating processes are also known. These are principally the sizes of the buffer memories at the decoders which need to be large in order to be capable of absorbing the bit rate variations of the corresponding video sources without the memory drying up or saturating. The buffer of the decoder must neither overflow (loss of data) nor dry up. The cost of the decoder is thus increased. On the other hand, the necessary memory capacity is no longer generally compatible with the MPEG2 standard.

The instantaneous variation in bit rate, that is to say at image level, generally demands even larger buffer memory capacities, whether this be at coder level or decoder level or alternatively has to be limited as a function of these memory capacities.

The aim of the present invention is to remedy the aforesaid drawbacks.

Its subject is a process for coding digital data of a video image sequence effecting image compression of this data and regulation of the bit rate at the output of the coder by way of a regulating loop acting on a quantization interval for the data to be coded, storage in a buffer of the data output by the coder for its transmission over a channel at a variable bit rate to a buffer of a decoder, a tagging of this data so as to guarantee a constant time $\tau$ between the instant of storage of an image in the buffer of the coder and the instant of output of this image from the buffer of the decoder, characterized in that the bit rate regulation in respect of the image at the instant n is performed as a function of a bit rate prediction in respect of the transmission channel for the instant n+$\tau$, and in that the regulation is performed within the limits of a virtual buffer defined by a top address and a bottom address in the buffer of the coder, the top address or offset of the virtual buffer changing with respect to the top address of the buffer of the coder, starting from a time $\tau$ before the variation of the transmission bit rate at the output of the buffer of the coder, depending on a value corresponding to the bit rate variation multiplied by the time $\tau$.

Its subject is also a process for transmitting data from several video sources effecting for each source a coding of this data in order to transmit it at a variable bit rate over a given transmission channel, characterized in that it effects, for each source, a bit rate allocation $\tau$ instant before the actual bit rate of this source over the channel, depending on the channel available bit rate and on measurements of complexity of the previous images from the set of video sources.

The characteristics and advantages of the present invention will emerge better from the following description given by way of example and reference to the appended figures in which.

Figure 1:
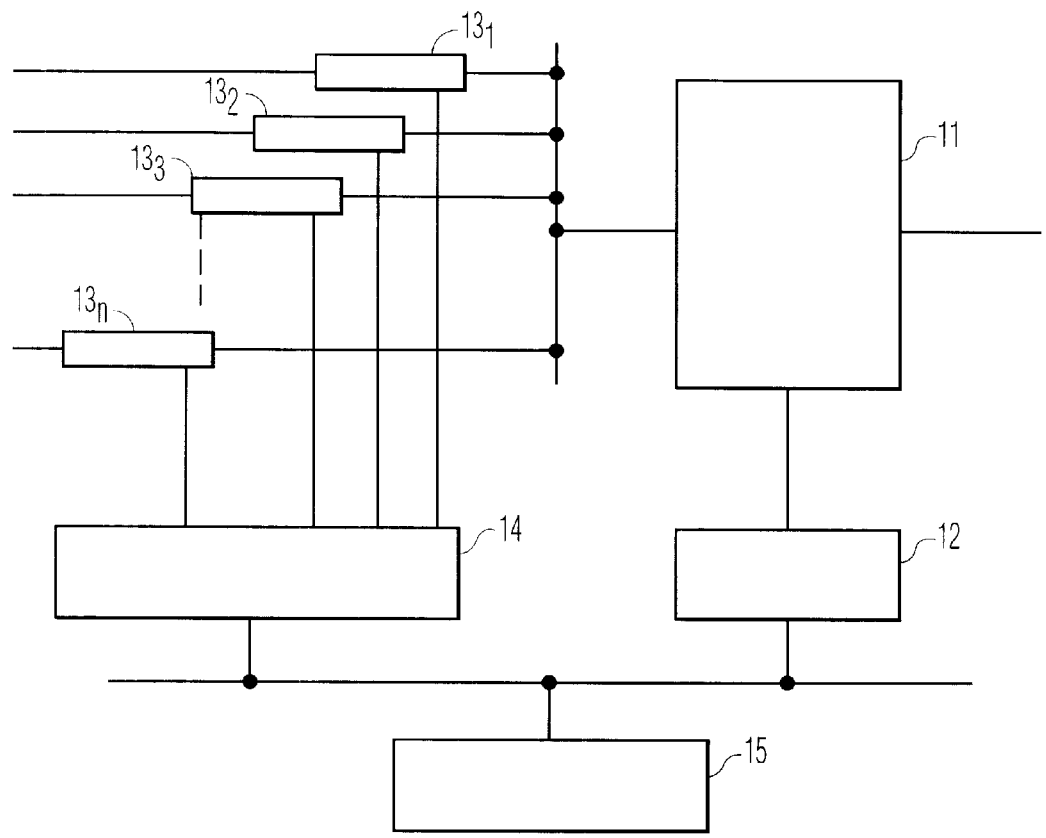
FIG. 1 represents a known set of transmissions from the prior art.

The advantages of the present invention relate to the size, which is reduced, of the buffer memory of the decoder. This memory thus remains compatible with the MPEG2 standard whilst allowing instantaneous variations in the bit rate within a very large range. The process has the capacity to react to each image, to an alteration in the bit rate, whilst guaranteeing the decoder's compliance with the size constraints of the video buffer. This capacity is all the more noteworthy in that it does not introduce any limitation as regards the maximum step in bit rate alteration, namely the bracket 1.5–15 Mbit/s of the MP@ML MPEG2 format (MPEG2 Main Profile Main Level).

By virtue of the invention, the available bit rate of the channel is optimized, that is to say apportioned in a manner which is optimized in terms of time and of value as a function of the complexity of the information of each video source.

The principle of video compression commonly referred to as MPEG2 is the subject of an international recommendation (ISO/IEC 13818 H.262). The functional architecture of an MPEG2 compressor is known, being described in this MPEG2 standard, and is briefly recalled below.

The video input of the coder receives digitally coded images with the 4.2.2. format. In the case of spatial coding (intra-image or "intra" coding), the images or more precisely the blocks making up an image undergo a DCT transformation directly, followed by quantization (images I), the quantized values then being variable-length coded (VLCi) before being stored in a memory or buffer. The latter provides for the "smoothing" of the bit rate at the output of the coder and a regulating loop makes it possible to tie the quantization interval to the bit rate setting. Inverse quantization followed by an inverse DCT transformation are also performed in such a way as to store in memory the reconstructed image which will serve as support in the motion estimation.

Inter-image or "inter" coding utilizes the temporal redundancies by coding a shifting of the blocks between the images. Two types of temporal coding exist:

predictive coding which relies solely on the images of like type or of intra type which precede them (forward) during motion estimation (images P);

bidirectional coding which relies on the images I and/or P which directly flank the image to be coded (images B).

The cosine transformation is applied only to the difference between images in the case of temporal coding. The error thus quantized, accompanied by the vectors which characterize the motions of the blocks making up an image allows reconstruction at the decoder.

A set made up of an image I followed by the images P and B which precede the next image I is called a GOP (Group Of Pictures).

The description of the principle of bit rate regulation, the subject of the invention, calls upon the VBV model such as described in the MPEG2 standard.

The VBV model, or Video Buffering Verifier, is defined as a hypothetical decoder wired to the output of the coder and making it possible to model the constraints on the variation in the bit rate. It rests upon the assumption that the decoder instantaneously extracts the images to be decoded from its buffer. This model is built into the algorithm for regulating the coder and is indispensable for the latter to know precisely the value of the instant of output of these images from the buffer of the decoder. It is the coder itself which is responsible for deciding these instants of decoding by means of a process, described in FIG. 2, according to the MPEG2 standard.

A coder 21 consists of the following elements:

a coding module 211 receiving the digital video data at its input, which is that of the coder, an output buffer 212 receiving on its input the coded data originating from the coding module, an insertion circuit 213 whose input is linked to the output of the buffer 212 for inserting a clock reference into the data originating from the buffer and for transmitting the data flux or bit stream thus constituted over a transmission channel 22, cable, radio or satellite link, an internal clock circuit 214 which receives from the coding module 211 the synchronization signal corresponding to the instant of arrival of the image at the coder, transmits a DTS (Decoding Time Stamp according to the MPEG2 standard) "decoding instant" to this module and which also supplies the insertion circuit with a PCR (Program Clock Reference) clock value.

The data transmitted over the channel arrive at the input of a decoder 23. The latter comprises:

a demultiplexing circuit 231 effecting extraction of the PCR clock reference and receiving on its input which is also that of the decoder, the data transmitted over the channel, a buffer of the decoder 232 receiving the data originating from the demultiplexing circuit, a decoding module 233 whose input is linked to the output of the buffer, performing the decoding operations inverse to the coding operations and supplying the decoded video data on its output which is also that of the decoder 23, an internal clock circuit 234 linked to the demultiplexing circuit in order to receive this PCR (Program Clock Reference) reference and also linked to the buffer in order to read the DTS decoding instant and transmit a read signal.

Thus, roughly every 100 ms, the value of the internal clock of the coder (PCR) is sent in the MPEG2 bit stream at the level of the transport layer (defined in the standard). The decoder picks up this PCR value in order to latch its own time reference by means of a phase locked loop or PLL located in the internal clock circuit 234. Thus, coder and decoder possess a common reference clock.

With each image which is presented to the input of the coder, the PCR clock is sampled and compensated by a time of transit. The information obtained, a decoding instant tag (DTS=Decoding Time Stamp), is inserted into the MPEG2 bit stream in association with this image and corresponds to the programmed decoding instant.

The decoder is responsible for receiving the images in its regulating buffer which stores for each of them the DTS instant at which the coder programmed the decoding. Thus, each time the PCR clock reconstructed at the decoder reaches the DTS value of the image positioned at the output of its buffer, the clock circuit initializes the decoding and the contents of the bit stream corresponding to the image are extracted from the buffer of the decoder by way of the read signal.

If VBV_size is the size of the buffer of the decoder and VBV_fullness the level of fill of this buffer at a given instant, by making the assumption that the decoder must extract the first encoded image from its buffer while the latter is full (VBV_fullness=VBV_size), it must wait, before enabling its output, a time equal to:

$$T_{init} = \tau - \frac{VBV\_size}{rate}$$

where τ is the time of transit in the buffers (end-to-end delay)

and rate is the output bit rate of the coder (transmission bit rate).

This is in fact the time of residence of the image in the buffer of the coder.

Figure 3:
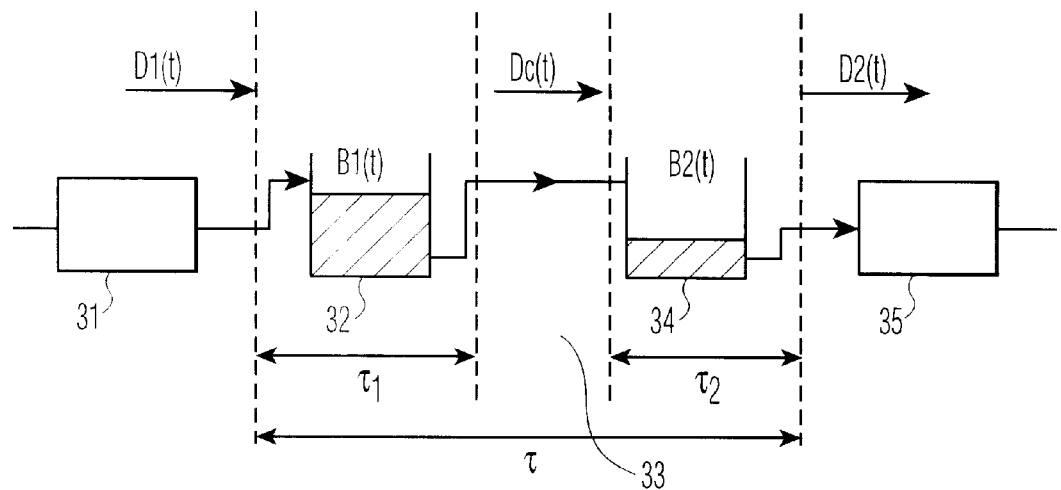
FIG. 3 represents, in a schematic manner, the filling of the buffer memories at the coder and decoder as a function of the bit rates.

A simplified diagram of the complete coding/decoding chain is represented in FIG. 3.

The following notation is adopted.

D1(t)=bit rate leaving the coding circuit at the instant t (input of the coder buffer), D2(t)=bit rate entering the decoding circuit at the instant t (output of the buffer of the decoder), B1(t)=buffer occupancy of the coder at the instant t, B2(t)=buffer occupancy of the decoder at the instant t, Dc(t)=channel bit rate at the instant t.

A coding circuit 31 receiving on its input the video data is linked to a buffer memory 32 symbolized by a receptacle filled with a quantity B1(t) of data which is the buffer occupancy. This buffer is linked by a physical link, radio or satellite, this link being referred to as the transmission channel 33, to the inputs of buffers 34 of decoders. Each buffer 34 has a fill state B2(t). The output of the buffer 34 is linked to the input of a decoding circuit 35 proper.

Let τ1 be the residence time of an image in the buffer 32 and τ2 the residence time of an image in the buffer 34 and τ the time elapsed between the instant of input of the image into the buffer of the coder and the instant of output of this image from the buffer of the decoder.

To guarantee a constant global processing time (compression+storage+transmission+storage+decompression), each image must traverse the coder and decoder side buffering or storage stage in a constant time τ, the coding and decoding times proper being constant and the bit rates at coder input and decoder output being identical:

τ=τ1+τ2=cons.

Figure 2:
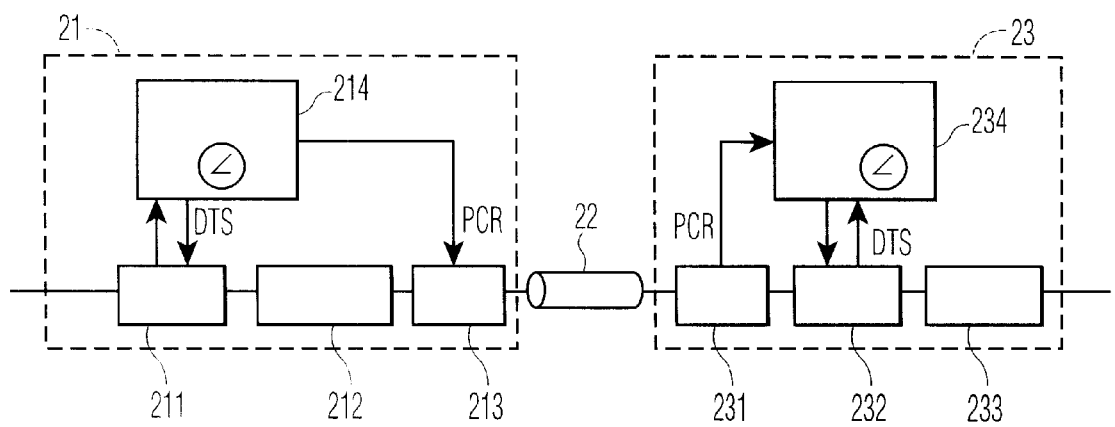
FIG. 2 represents a device for coding and for decoding according to the MPEG2 standard.

To guarantee this constant time τ and, referring to FIG. 2, the decoding instant tag DTS inserted into the bit stream is calculated by subjecting the sampling value for the PCR clock corresponding to the arrival of an image at the input of the coder to a positive offset equal to the time of transit τ in the coder and decoder buffers (time of transit also termed end to end delay).

τ being the time of transfer of a complete image, the bit rate at the input of the buffer of the coder at the instant t is equal to that at the output of the buffer of the decoder at the instant t+τ:

D1(t)=D2(t+τ)

The initial conditions at the instant t0 are as follows:

$$B1(t0)=B2(t0)=0$$

$$\int_{t_0}^{t_0+\tau} D_2(t)\,dt = 0$$

Buffer state of the decoder at the instant t0+τ:

$$B_2(t_0 + \tau) = \int_{t_0}^{t_0+\tau} D_c(t)\,dt$$

At any instant, the buffer state of the coder is equal to:

$$B_1(t) = \int_{t_0}^{t} (D_1(t) - D_c(t))\,dt$$

In the same way, the buffer state of the decoder at t+τ can be written:

$$B_2(t+\tau) = \int_{t_0}^{t+\tau} (D_c(t) - D_2(t))\,dt$$

We therefore have:

$$B_2(t+\tau) =$$

$$\int_{t_0}^{t} D_1(t)\,dt - B_1(t) + \int_{t}^{t+\tau} D_c(t)\,dt - \left[\int_{t_0}^{t_0+\tau} D_2(t)\,dt + \int_{t_0+\tau}^{t+\tau} D_2(t)\,dt\right] =$$

$$\int_{t_0}^{t} (D_1(t) - D_2(t+\tau))\,dt - B_1(t) + \int_{t}^{t+\tau} D_c(t)\,dt - \int_{t_0}^{t_0+\tau} D_2(t)\,dt =$$

$$\int_{t}^{t+\tau} D_c(t)\,dt - B_1(t)$$

The above relation characterizes the behaviour of the buffer of the decoder on the basis of measurements performed on the buffer of the coder.

When the bit rate over the channel is constant, the buffer states are complementary:

$B_2(t+\tau)=B_2(t_0+\tau)-B_1(t)$, with $B_2(t_0+\tau)$=initial state of the decoder buffer.

This result expresses the intuitive principle of communicating vessels between the buffers of the coder and of the decoder with a lag equal to the time of traversal of a data item through these two buffers.

For MPEG II Main Profile Main Level (MP@ML) video coding, the constant obtained by adding the two buffer volumes is limited to 1.835 Mbit.

When the bit rate over the channel is variable, the state of the buffer of the decoder can only be known explicitly on condition that the volume:

$$\int_{t}^{t+\tau} D_c(t)\,dt$$

is known.

This volume equal to B1(t)+B2(t+τ) characterizes the offset of a virtual buffer situated in the coder buffer and defined below.

Figure 4:
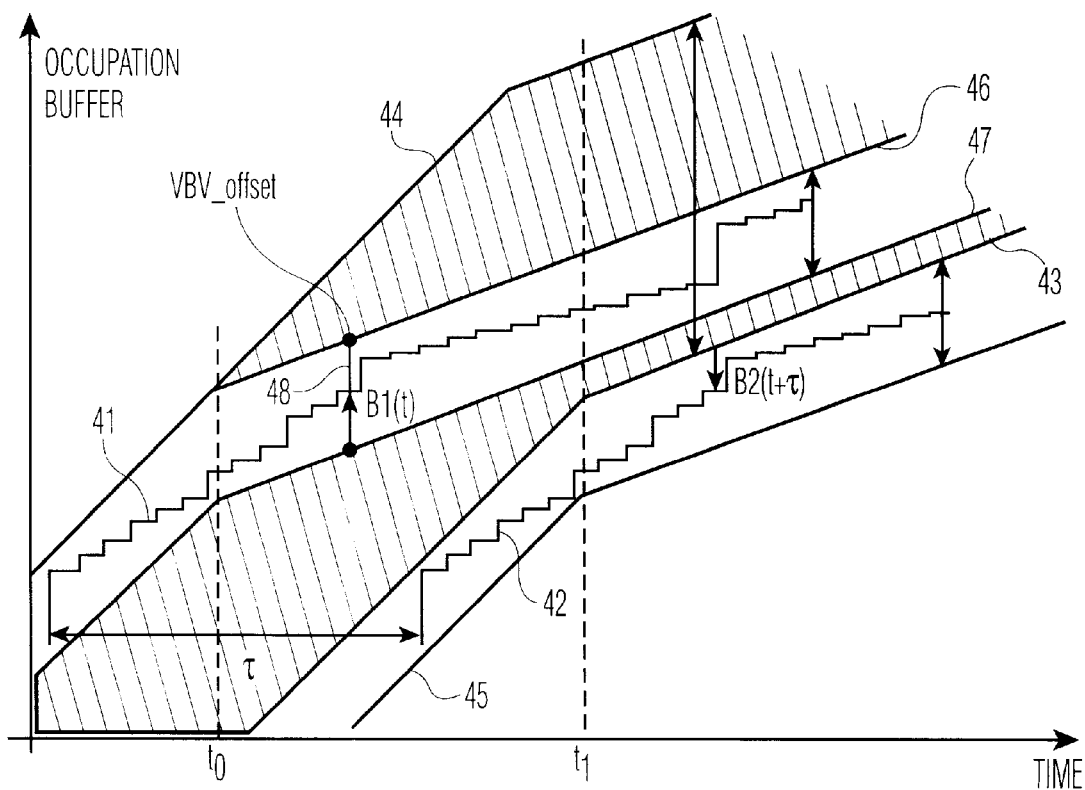
FIG. 4 represents an example of the change in size and position of the virtual buffer as a function of time.

FIG. 4 represents an example of the accumulated occupancy of the buffers as a function of time, that is to say the quantity of information accumulated in the buffers of the coder and of the decoder and makes it possible to deduce the changes in the fill of each of the buffers.

The abscissa axis represents time and the ordinate axis the accumulated occupancy or quantity of information accumulated in the buffers.

Curve 41 corresponds to the coder buffer and can be likened to a buffer write address or write pointer and each vertical stroke represents the quantity of information stored by the buffer and required for the inter or intra coding of an image (longer strokes for intra).

Curve 42 corresponds to the decoder buffer and to the decoder buffer read pointer and represents the quantity of accumulated information leaving the buffer. By virtue of the above-cited relation, this second curve is a translation along the abscissa axis of the first curve by a value $\tau$.

Curve 43 represents the quantity of accumulated information leaving the buffer of the coder and the quantity of information entering the buffer of the decoder. These curves are superimposed and represent the quantity of information transmitted over the channel, since the time of transit in the channel is assumed to be equal to zero in order to simplify the reasoning. In fact, curve 43 represents the read pointer of the buffer of the coder which is superimposed on the write pointer of the buffer of the decoder. The slope of this curve is the channel bit rate Dc(t), the bit rate at the output of the buffer of the coder and at the input of the buffer of the decoder.

Curve 44 symbolizes the actual size of the coder buffer and curve 45 the size of the decoder buffer. This is a translation of curve 43 along the ordinate axis, by a positive vector with modulus the size of the buffer of the coder for the former, and by a negative vector with modulus the size of the buffer of the decoder for the latter. Finally, the curves 46 and 47 serve to model a virtual buffer in the coder buffer by defining its position and size.

This virtual buffer represents a "useful" regulating zone in the buffer of the coder and constitutes the image in the buffer of the codes of the VBV model.

The positioning in the physical buffer of the coder is calculated in such a way as to guarantee a constant time of transit for each image at all bit rates.

It is defined by a parameter VBV offset which is the maximum address in the regulating zone at the given instant t. It corresponds to the deviation between the curves 43 and 46 read off on the ordinate axis.

Knowing this parameter VBV_offset makes it possible at any instant to verify the decoder's compliance with the buffer occupancy constraints, relying on the VBV model. It is essential to know this for proper operation of the regulating algorithm.

The positioning of the virtual buffer in the physical buffer of the coder is obtained as indicated below.

We have the relation:

$$B_2(t+\tau) = \int_t^{t+\tau} D_c(t)dt - B_1(t)$$

This relation can be expressed by "discretizing" at image level:

$$B_2(n+\tau) = \sum_{k=n+1}^{k=n+\tau} D_c(k) - B_1(n)$$

In this discrete formulation:
n represents the image at the instant t

Dc(k) represents the bit rate at the image (bits per image) at the output of the coder, during the coding of image k $\tau$ is expressed in terms of number of images corresponding to the duration $\tau$.

We thus obtain for the previous image:

$$B_2(n+\tau-1) = \sum_{k=n}^{k=n+\tau-1} D_c(k) - B_1(n-1)$$

From this we deduce the variation in the buffer occupancy factor:

$$\Delta B_2(n+\tau) = B_2(n+\tau) - B_2(n+\tau-1)$$
$$= \sum_{k=n+1}^{k=n+\tau} D_c(k) - B_1(n) - \left[\sum_{k=n}^{k=n+\tau-1} D_c(k) - B_1(n-1)\right]$$
$$= D_c(n+\tau) - D_c(n) - \Delta B_1(n)$$

Noting that:

$$\Delta B1(n) = \Delta D1(n) - D_c(n) - \epsilon_{Dc(n)}$$

we obtain the formula for updating the occupancy factor of the virtual buffer:

$$\Delta B2(n+\tau) = Dc(n+\tau) - \Delta D_1(n) + \epsilon_{Dc(n)}$$

a formula in which $\Delta D1(n)$ corresponds to the cost of coding the image at the instant n and where Dc(n+$\tau$) is the expected bit rate at the output of the coder at the instant n+$\tau$. The third term in the equation is the error measured at the instant n between the expected bit rate at the output of the coder and the value actually measured Dc(n).

The cost of coding the image at the instant n therefore depends on the expected bit rate at the output of the coder at the instant n+$\tau$. Complying with this fundamental principle, we have at any instant the buffer occupancy information for the VBV model by applying the calculation:

VBV_fullness(n)=VBV_fullness(n−1)+Dc(n+τ)−Last_picture_cost+ϵDc(n)

In accordance with the above condition, the setting is received just before the coding of image (n) and originates from an external facility (bit rate allocator).

This bit rate allocator receives for example the complexity of the previous images over the duration of a GOP in order to predict a channel bit rate $\tau$ instant later, possibly taking into account the complexities of the video sources requiring to be transmitted over the same channel.

If Bpp(n) denotes the setting for the expected channel bit rate at the output of the coder for the image period (n+$\tau$), it is possible to define the updating of the VBV model at image level by the equation:

VBV_fullness(n)=VBV_fullness(n−1)+Bpp(n)−Last_picture_cost+ϵBpp(n−τ)

where:
ϵBpp(n−τ)=Bpp(n−τ)−Dc(n)
represents the error between the setting received before the coding of image (n−τ) and the actual bit rate at the output of the coder during the coding of image n.

This relation prompts us to posit the principal condition of operation of the variable bit rate coder:

The bit rate information cue received by the regulating algorithm must precede its actual application at the output of the coder by a constant time equal to the time of transit in the coder and decoder buffers.

The modelling of the buffer state of the decoder involves knowing a priori the channel bit rate over the horizon $[t, t+\tau]$ at the moment of the coding of the image presented at the instant t to the coder.

Thus, by controlling the position of this virtual buffer, the coder is able to predict any possible overstepping which could occur at the decoder. With regard to FIG. 4, it may clearly be seen that reproduction of the buffer of the decoder by the virtual buffer involves a mechanism of anticipation during bit rate alterations.

For a high bit rate, the useful zone for regulating the coder is situated in the "top" part of the physical buffer symbolized by the curves 43 and 44, and it switches to the bottom part of the buffer when a low bit rate is reached.

This switch anticipates the alteration in the bit rate of the channel by a duration $\tau$.

The time of traversal of the two buffers is constant. It is chosen by taking account of the time of traversal of the buffers for operation at the minimum allowable bit rate. We choose $\tau$>VBV_size/bit rate_min.

This value may become penalizing if it is desired to comply with a constraint of small delay for high bit rates (possible constraint to a schedule of specifications). However, it is possible to limit the useful regulating zone to low bit rates in order to reduce the time $\tau$.

Let us note, finally, that the size of the buffer of the coder is greater than that of the buffer of the decoder in a proportion equal to the ratio of the maximum bit rate to the minimum bit rate. For a given format of image, this ratio will not exceed 4, thus making it possible to predict a buffer size at the coder of a 8 Mbits (for a useful max size of 1.835 Mbits in MP@ML).

Figure 5:
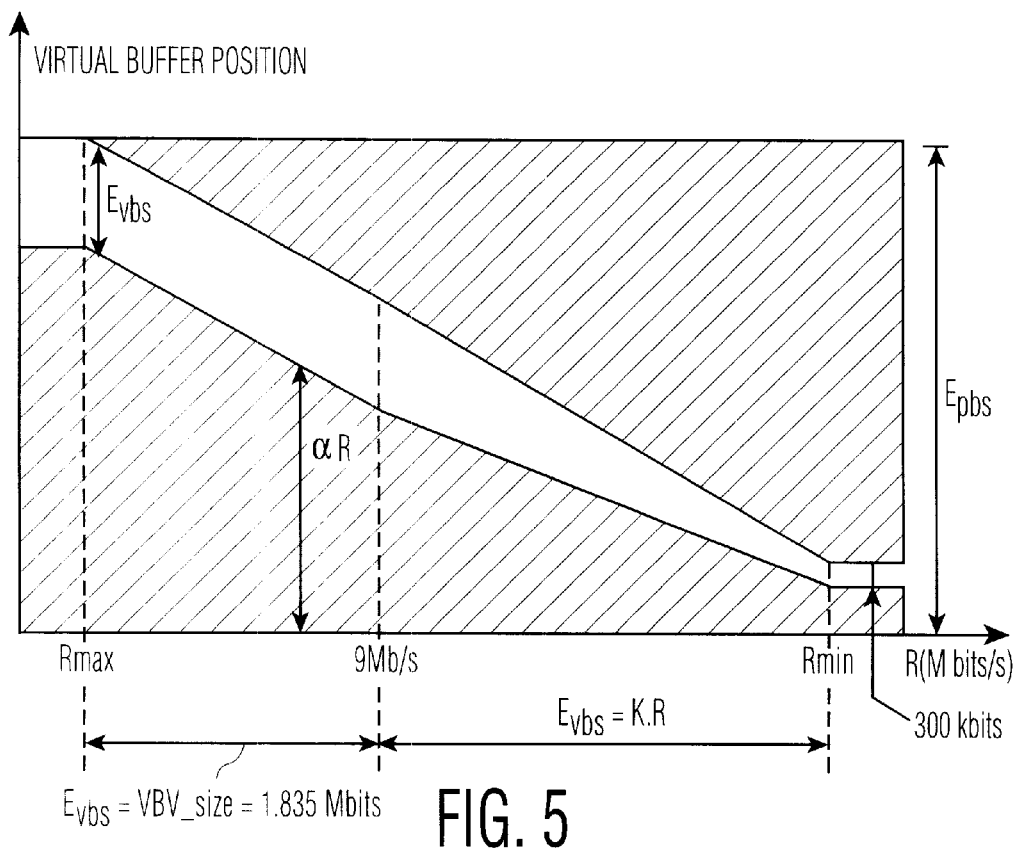
FIG. 5 represents the size and position of the virtual buffer in the physical buffer of the coder as a function of the bit rate.

FIG. 5 is a representation of the virtual buffer in the physical buffer of the encoder. It shows how the virtual buffer must be positioned and what its size must be as a function of the current bit rate.

The bit rate is plotted along the abscissa axis in Mbits/s in a decreasing sense and the "position" of the virtual buffer is plotted along the ordinate axis in Mbits.

For a maximum bit rate and in the saturation zone, the size of the virtual buffer is equal to the size of the buffer of the decoder, for example 1.835 Mbits in our example.

Evbs=VBV_size.

$$\alpha(n) = \tau - \frac{VBV\_size}{R}$$

The virtual buffer is located in the top part of the buffer of the encoder.

In the linear zone, that is to say between 9 Mbits/s in our example and the minimum bit rate of 1.5 Mbits/s, the size of the buffer decreases linearly and is equal to:

Evbs=KR $\alpha(n)$=constant

Still discretizing at image level, the size of the physical buffer of the encoder (physical buffer size) will be called Epbs(n) and the size of the virtual buffer of the encoder (virtual buffer size) will be called Evbs(n) at the moment of the coding of image n.

The virtual buffer is dimensioned in such a way as to be entirely filled by an intra-coded image when he transmission bit rate is maximal.

The size of the virtual buffer of the encoder as at most that of the buffer of the decoder, namely VBV_size; when the transmission bit rate becomes low, it may be decreased to a value K.R(n), K being a time constant, with a value of between 0.1 and 0.2, depending on the structure of the GOP and on the transmission bit rate and R(n) the transmission bit rate for an image n.

$$Evbs[n]=min(VBV\_size, K.R[n]) \quad (a)$$

For simplicity, the size of the virtual buffer is therefore defined as a linear function of the bit rate until the size of the buffer of the decoder at a given bit rate is reached; subsequently, the size of the buffer is held constant at this saturation level.

Taking our example again:

Epbs=7.2 Mbits

K=0.2 s

Rmax=15 Mbit/s

Rmin=1.5 Mbits/s $\tau$=480 ms

Evbs varies from 1.835 Mbits to 300 kbits for the minimum value.

The offset of the virtual buffer is 7.2 Mbits for the maximum bit rate and 420 kbits ($\alpha(n) \times$Rmin) for the minimum bit rate.

Figure 6:
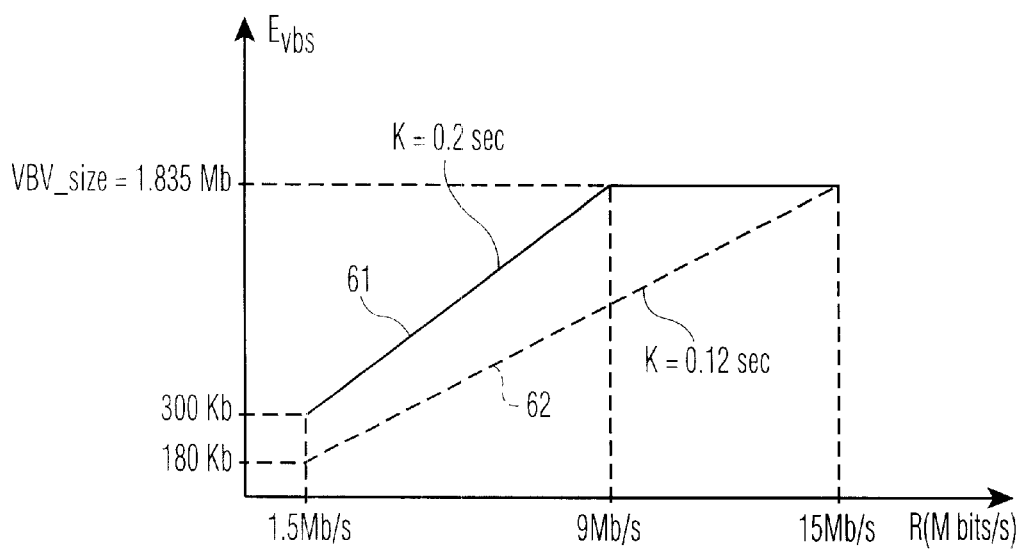
FIG. 6 represents the size of the virtual buffer in the physical buffer of the coder as a function of the bit rate.

FIG. 6 gives an example of the changes in the size of the virtual buffer as a function of the bit rate and for various values of this parameter K.

The abscissa axis represents the bit rate in Mbits/s, the ordinate axis the size of the virtual buffer in Mbits. Curve 61 corresponds to a value of K equal to 0.2 and the dashed curve 62 to a value of K equal to 0.12. In accordance with the MPEG 2 standard, the size of the buffer of the decoder is taken equal to 1.832 Mbits, and the variation in the bit rate is between 1.5 and 15 Mbits/s.

Curve 61 is split into two zones, a linear zone between 1.5 and 9 Mbits/s and a saturation zone from 9 to 15 Mbits/s.

If $\tau$ is the global bufferization duration, that is to say the time elapsed between the instant of writing the image to the buffer of the encoder and the instant of reading this same image from the buffer of the decoder, this time being akin to the time of traversal of the buffers as previously explained and if $\alpha(n)$ is a duration calculated so as to guarantee the value of $\tau$ constant, we have the relation:

$$\tau = \frac{E_{vbs}[n]}{R[n]} + a[n] \quad (b)$$

$\tau$.R(n)=$\alpha$(n).R(n)+Evbs represents the offset of the virtual buffer as defined previously.

Calculation of the positioning of the virtual buffer in the buffer of the coder amounts to calculating and updating, continuously, a parameter $\alpha(n)$ in such a way that, for a given size of virtual buffer complying with relation (a), for a bit rate and a fixed transfer time, it complies with relation (b).

Stated otherwise, the size and position of the virtual buffer are continuously adapted in such a way as to guarantee a constant transfer time.

Once the value of K has been chosen, the value of $\alpha$ is deduced therefrom.

Figure 7:
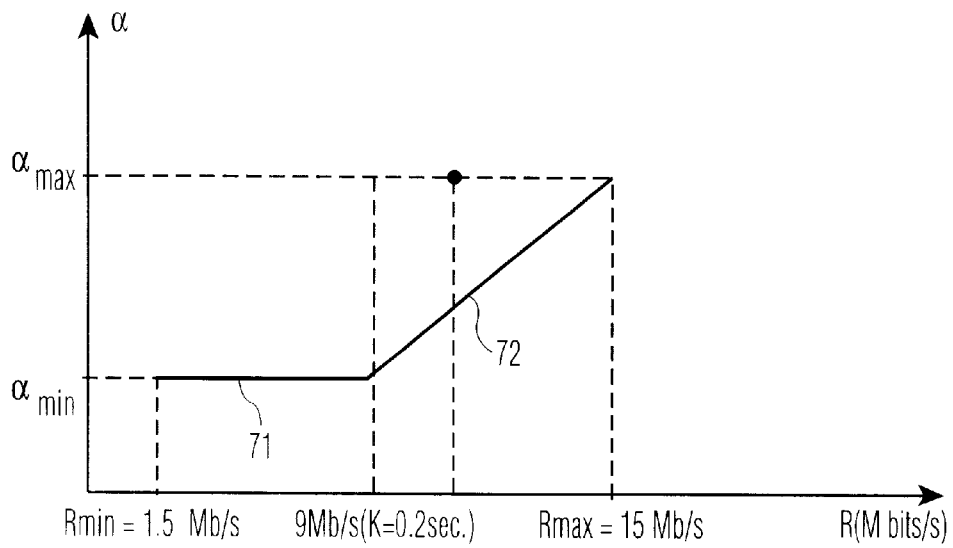
FIG. 7 represents the change in the parameter $\alpha$ as a function of the bit rate.

FIG. 7 represents the changes in $\alpha$ (along the ordinate) as a function of the bit rate (along the abscissa).

This value of α(n) must be continuously adapted to the bit rate in such a way as to guarantee a constant value of τ.

For the first part 71 of the curve, between 1.5 Mbits/s and 9 Mbits/s, which corresponds to the linear zone, the value of α is constant and equal to:

$$\alpha_{min} = \frac{E_{pbs}}{R_{max}} - K$$

For the second part of the curve 72 corresponding to the saturation zone, α varies from αmin to αmax:

$$\alpha_{max} = \frac{E_{pbs} - VBV\_size}{R_{max}}$$

The minimum value of K is equal to:

$$K_{min} = \frac{VBV\_size}{R_{max}}$$

The chosen value of K is generally greater than this minimum value corresponding to the absence of a saturation zone, the typical value is 0.2. This is the reason why the value of α(n) must be continuously readjusted, this value then not being constant.

Figure 8:
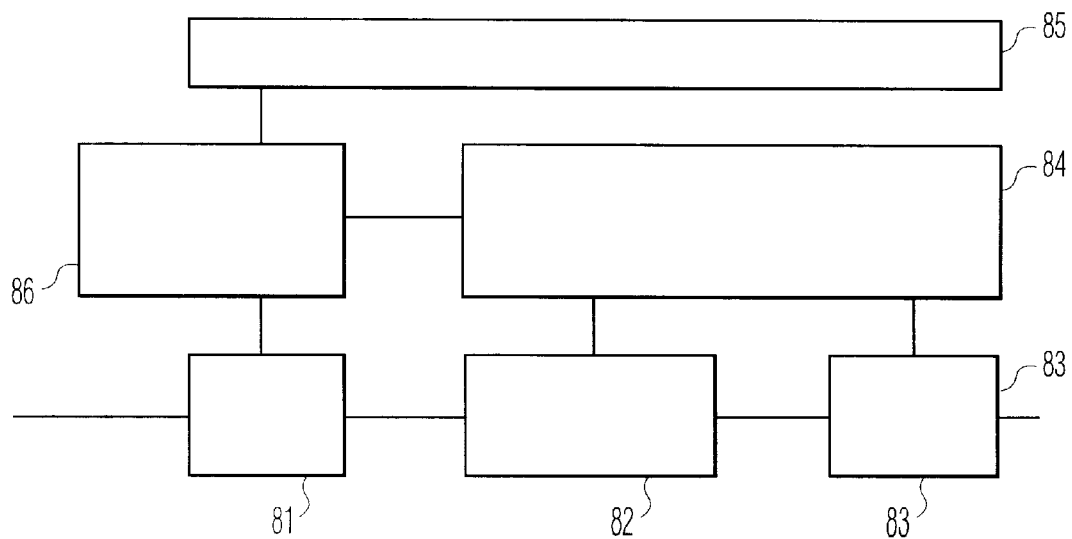
FIG. 8 represents a device for coding according to the invention.

The coder according to the invention is represented in FIG. 8 and is described below.

A preprocessing circuit 81 receives the data to be coded. It is linked, via its output, to the input of a coding circuit 82. The output of the latter is linked to the input of a buffer 83 which supplies at its output the binary stream to be transmitted to the decoders. The output of the buffer is also linked to an input of a regulator 84. The regulator receives, on another input, data originating from the coding circuit, an output of this circuit being linked to an input of the regulator. A local supervisory facility 86 is linked to a bit rate allocator 85, to the preprocessing circuit 81 and also to the regulator 84.

The preprocessing circuit 81 receives the useful video signal contained in the digital source with the 4.2.2. format in order to filter it and shape it and more particularly reorder the images received according to the type of coding chosen for each of them. The video coding circuit 82 compresses and formats the signal received into a binary train with the MPEG2 format called the "elementary stream". This signal traverses the output buffer 83 so as to be transmitted to the decoders in the form of a binary stream or "bit stream". The regulator measures, from the coded data making up the binary stream and transmitted by the buffer, the actual bit rate at the output of the coder. The coding circuit 82 transmits the coded data to the regulator so as to allow it to calculate a coding cost and a quantization interval which is returned to it. The local supervisory facility 86 receives a coefficient of complexity of the regulator 84 which it will transmit to the bit rate allocator 85 which also receives this information cue from the other video sources and which allocates a bit rate accordingly to each video source by controlling the multiplexing of these various video sources. The local supervisory facility 86 therefore provides for the interface with the outside and receives in particular from the bit rate allocator the bit rate information cues phase-advanced relative to their application at the output of the coder. It is also linked to the preprocessing circuit 81 so as to transmit thereto among other things the GOP structures originating from the regulator 84 so as to allow the preprocessing circuit to reorganize the images.

The regulator checks the quantization interval of the data compressor of the coding circuit. This regulator builds in a VBV model of the buffer of the decoder in the physical buffer of the coder, referred to as the virtual buffer, as well as a facility for measuring the bit rate at the output of the coder in such a way as to guarantee that the buffer of the video decoder will neither saturate nor dry up.

The bit rate regulator, which acts on the quantizer interval as a function of the state of the buffer, can be broken down into two functional sub-blocks:

The image regulation sub-block, which performs regulation at image level only, receives for each image to be encoded a "target bit" setting which corresponds to the volume of data which it is desired to generate for the next image to be coded. This item is determined by another GOP regulation sub-block performing regulation at GOP level, as a function of the configuration parameters of the coder and of the state of the VBV model.

Starting from the initial quantization interval for coding the first block of the image, the image regulating algorithm adjusts the quantization interval dynamically so as to come as close as possible to the "target bit" which has been programmed for it. This adjustment is carried out by a feedback system whose stiffness (rate of convergence) can be controlled by the parameter of the same name.

At the end of the image, the image regulation sub-block transmits the actual cost of coding the image to the GOP regulation sub-block. The latter calculates the error between this cost and the "target bit" transmitted. The error is then fed back into the algorithm for calculating the "target bits" for the following image. The image regulation sub-block also transmits the mean quantization interval used for coding the last image. This serves for calculating the a posteriori complexity of the image which has just been coded, as explained hereafter.

The principle of calculating the "target bits" by the image regulation algorithm is as follows:

Let Ti, Tp(n) and Tb(m) be the target costs (targets) of coding, respectively, the intra image, the image n out of the predictive images, and the image m out of the bidirectional images, this for a given GOP:

TI=Target bit for the coming image of type I,

TP=Target bit for the coming image of type P,

TB=Target bit for the coming image of type B,

QI=Mean quantization interval for the image of type I,

QP=Mean quantization interval for the image of type P,

QB=Mean quantization interval for the image of type B,

NP=Number of images of type P in the GOP,

NB=Number of images of type B in the GOP.

A GOP of N images consists of an intra image, NP predictive images and NB bidirectional images:

N=1+NB+NP.

The principle of regulation by GOP therefore entails complying with the relation:

$$Ti + \sum_{n=1}^{Np} Tp(n) + \sum_{m=1}^{Nb} Tb(m) = NBpp$$

Assuming stationarity of the coding costs per type of image in the GOP, we obtain the basic equations for inter-image regulation:

$$T_I + N_P T_P + N_B T_B = N \times B_{pp} - \varepsilon \qquad (1)$$

$$Z_I Q_I = Z_P Q_P = Z_B Q_B \qquad (2)$$

$$\begin{cases} X_I = Cout_{lastI} Q_{lastI} \approx T_{nextI} Q_I \\ X_P = Cout_{lastP} Q_{lastP} \approx T_{nextP} Q_P \\ X_B = Cout_{lastB} Q_{lastB} \approx T_{nextB} Q_B \end{cases} \qquad (3)$$

Equation (1) expresses the principle of distributing the available bit rate over the set of images which make up the GOP. This available bit rate is, however, decreased or increased by an error $\varepsilon$ which corresponds to the sum of deviations (target bit−actual cost of coding) measured over the set of images of the previously coded GOP.

$$\varepsilon = \varepsilon_I + \sum_{GOP} \varepsilon_P + \sum_{GOP} \varepsilon_B \qquad (4)$$

Equation (2) makes it possible to establish a rule of correspondence of the mean quantization intervals between images of different type so as to maintain a stable quality between these images of different type. The empirical values of the constants of proportion are:

ZI=1.0,

ZP=1.35,

ZB=1.1

The system of equations (3) gives the calculation for the image complexity as the product of the mean quantization interval multiplied by the cost of coding the last image of like type. An important assumption of stability of complexity then makes it possible to express this same complexity on the basis of the target bits used to code the images to come. Stated otherwise, the assumption is made that the image complexities of the next GOP are equal to the complexities measured at the previous GOP.

This prediction of the complexity makes it possible to obtain the a priori calculation of the target bits and of the initial quantization intervals for each type of image:

$$\begin{cases} T_I = \dfrac{Z_I X_I \times (N \times B_{pp} + \varepsilon)}{Z_I X_I + N_P Z_P X_P + N_B Z_B X_B} \\ T_P = \dfrac{Z_P X_P \times (N \times B_{pp} + \varepsilon)}{N_P Z_P X_P + N_B Z_B X_B} \\ T_B = \dfrac{Z_B X_B \times (N \times B_{pp} + \varepsilon)}{N_P Z_P X_P + N_B Z_B X_B} \end{cases} \quad \begin{cases} Q_I = \dfrac{X_I}{T_I} \\ Q_P = \dfrac{X_P}{T_P} \\ Q_B = \dfrac{X_B}{T_B} \end{cases} \qquad (5)$$

The system of equations (5) makes it possible in most cases to yield values in accordance with the decoder regulating constraints. However, the error passed on from one GOP to another is not bounded a priori and the output bit rate may undergo some variations inherent in the mode of implementation chosen.

This is why the GOP regulation sub-block builds in the VBV model. This simplified model of the behaviour of the decoder uses the following assumptions, mentioned previously:

the coding and decoding times are zero;

the introduction of an image into the buffer of the coder after coding is instantaneous;

the withdrawal of an image for decoding is also instantaneous at the decoder.

Thus, at each encoded image, the regulating algorithm updates the state of occupancy of the buffer of the VBV model by applying the relation:

VBV_fullness($n$)=VBV_fullness($n$)+Bpp($n$)−Last_picture_cost+ $\varepsilon$BPP($n$−$\tau$)

As mentioned previously, this relation expresses the fact that Bpp bits are input into the buffer of the decoder when the equivalent of the last coded image has been withdrawn. The additional error $\varepsilon$BPP represents the deviation measured at the output of the coder between the measured bit rate and the expected bit rate:

$$\varepsilon_{B_{pp}}(n-\tau) = \int_{last\_picture} D_c(t) dt - Bpp(n-\tau),$$

$D_c(t)$: coder output bit rate at $t$

The first use of the VBV model relates to the padding operation (zero bytes appended to the end of the image in the bit stream) which is essential in order to guarantee that the buffer of the decoder will not saturate either over the current image nor during the sending of the coming image. The operation consists in verifying that the buffer occupancy stemming from the model never oversteps the maximum size of the buffer of the decoder, less the value Bpp of the expected volume of data at the input of the buffer of the decoder during the next image period. Hence:

If (VBV_fullness($n$)>VBV_size−Bpp($n$+1)) then

Last_pict_cost($n$)=Last_pict_cost($n$)+VBV_fullness($n$)−(VBV_size−Bpp($n$+1)), VBV_fullness($n$)=VBV_size−Bpp($n$+1)

VBV_size represents the useful size of the buffer of the decoder (1.835 Mbits for MPEG2 in Main Profile Main Level). A volume of padding data corresponding to the offset applied to the cost of the image is then introduced.

Beyond the padding, exact knowledge of the state of occupancy of the buffer of the VBV model allows preventive readjustment of the target bits of the next images to be encoded. This latter step is essential in order to predict buffer violations. Two particular cases may arise:

the observed state of the buffer of the VBV model comes excessively close to the state of dry-up. In this case, the values of the next target bits must be decreased by a quantity which is all the larger the greater the risk;

the observed state of the buffer of the VBV model comes excessively close to the state of saturation. In this case, the values of the next target bits must be increased by a quantity which is all the larger the greater the risk;

Initialization of the state of the buffer of the VBV model is carried out by assuming that the buffer of the decoder is entirely full. To ensure this state, the concept of the delay in transit of the data through the coder and decoder buffers (end-to-end delay) is taken into account, associated with the principle of synchronization between coder and decoder as described previously.

The principle of operation of the algorithm is therefore characterized by the calculation, by the GOP regulating sub-block and at an image tempo, "target bit" and "initial quantization interval" parameters forwarded to the image regulating sub-block.

Figure 9:
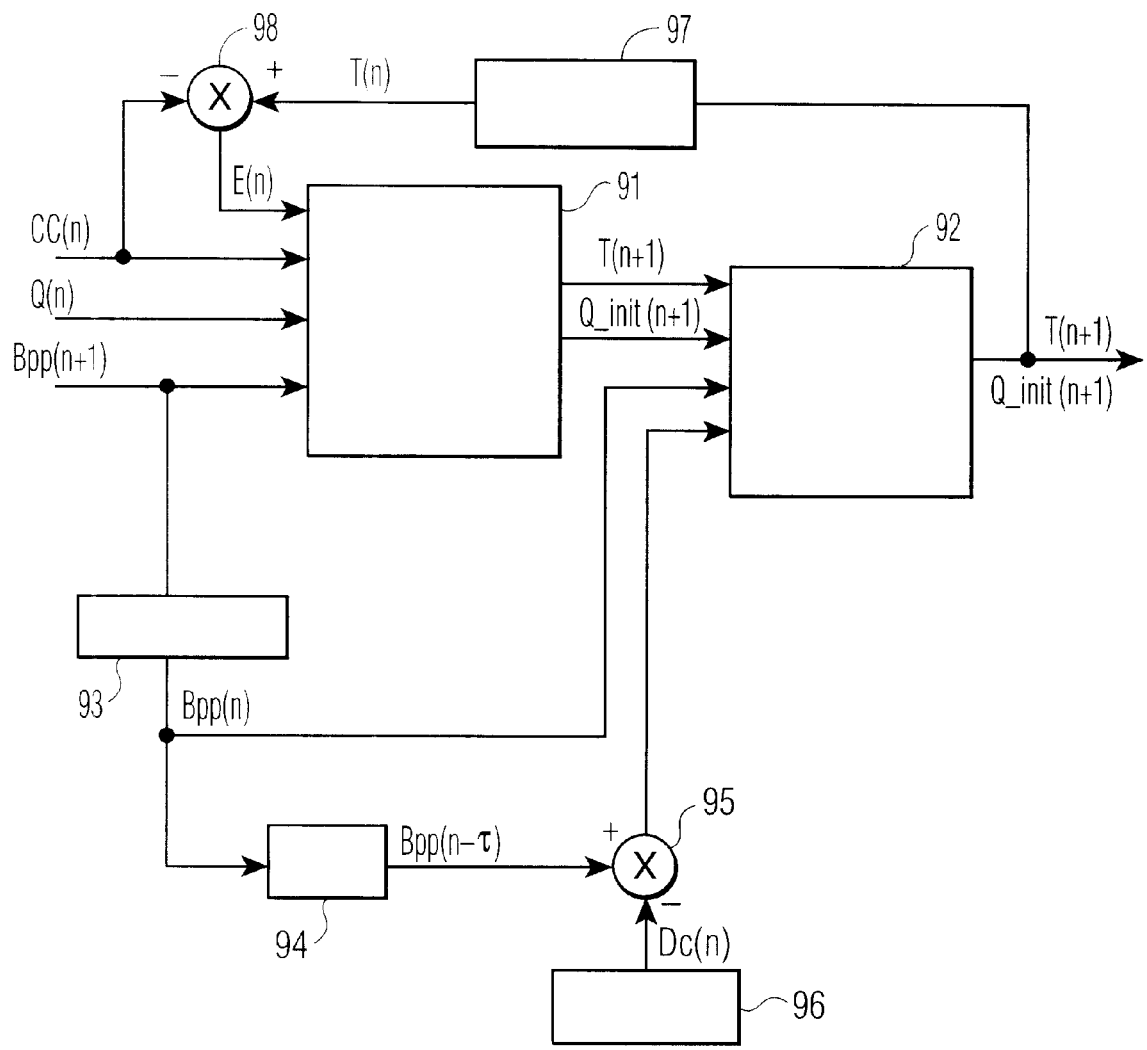
FIG. 9 represents a device for regulating according to the invention.

FIG. 9 is a schematic representation of the GOP regulating sub-block and of the various calculations performed by the sub-block regulating algorithm.

A pre-calculation module 91 receives the "coding cost" CC($n$) and "mean quantization interval" Q($n$) information cues stemming from the previously coded image n and transmitted by the image regulating sub-block as well as, on a third input, the error E(n) between the expected cost (Target bit T(n)) and the actual cost CC (n). On a fourth input it also receives the information cue regarding the expected bit rate Bpp(n+1) corresponding to the instant of coding the following image n+1 and which is the setting originating from the bit rate allocator. The allocator, as stated, transmits a channel bit rate setting to the regulator an instant τ before this bit rate is effective. It therefore supplies a bit rate information cue Bpp(n+1) for the following image. The module 91 transmits on a first and on a second input of a control module 92 the target bit T(n+1) information for image n+1 and the initial quantization interval Q_init(n+1) for image n+1.

The bit rate information cue originating from the allocator is also transmitted to a delay by one image duration circuit 93. The output from this circuit is transmitted on the third input of the control module 92. The output from the delay circuit 93 is also transmitted to the input of a delay by a duration τ circuit 94. The output of this circuit is linked to a first input+of a first subtractor 95 which on its second input receives the bit rate information cue measured at the output of the coder by a bit rate measurement circuit 96. The output of this subtractor is linked to a fourth input of the control module 92. This control module readjusts the parameters of the virtual buffer and transmits on its output, which is also the output of the GOP regulation sub-block, the initial target bit and quantization interval information for the following image n+1. These two information cues are transmitted to the image regulation sub-block for coding the next image.

The purpose of the control module is to verify a posteriori the risks of buffer violation. To do this, it therefore receives on its inputs the difference Bpp(n−Σ)−Dc(n) corresponding to the error between the setting value and the actual value of the bit rate as well as the parameters T(n+1) and Q_init(n+1) for the next image and Bpp(n) for the image currently being coded. This information allows the control module to calculate the variation in the fill factor of the virtual buffer.

The value of the Target bit of the following image possibly corrected T(n+1) is fed back to a delay by one image duration circuit 97 whose output drives the +input of a second subtractor 98. The −input of this subtractor receives the cost of coding the current image CC(n) and its output is connected to the third input of the precalculation module 91.

Figure 10:
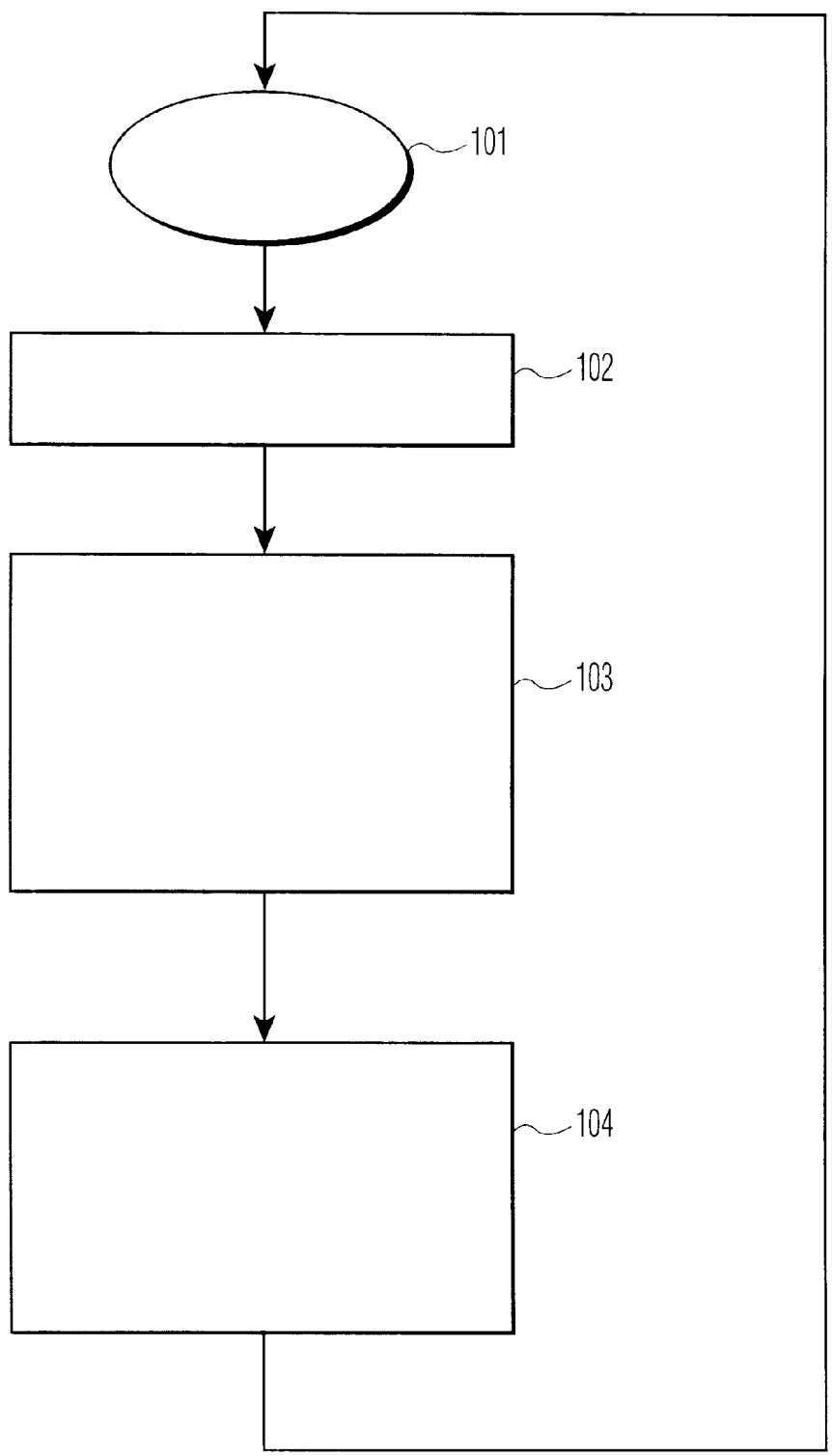
FIG. 10 represents a flowchart of the regulating process according to the invention.

The various calculations performed by the precalculation module and the control module are explained with the aid of the flowchart described in FIG. 10.

The first step 101 is an interrupt wait loop for triggering tasks. An image interrupt informs the algorithm that the information arising from the image regulation in respect of image n which has just been encoded is available. This is followed by step 102 which reads the following information:
  coding cost CC(n) for image n,
  mean quantization interval $\overline{Q(n)}$ for image n,
  image-related bit rate setting Bpp(n+1) for image n+1,
  type of the image n+1 (I, P or B),
  bit rate at the output of the coder Dc(n) for image n.

The next step 103 calculates the "target bits" for each type of image. The results of the coding of the previous image (coding cost and mean quantization interval) are used to calculate the complexity of image n.

The error, E(n), relative to the "target bit" which arises from the coding is calculated for each image n and accumulated over a GOP for storage, at the end of the GOP, as the value ε. E(n) is initialized at the first image of the next GOP.

$$X(n)=CC(n)\times\overline{Q(n)}$$

$$E(n)=E(n-1)+T(n)-CC(n)$$

A new "target bit" is calculated for image n+1 for each type of image:

$$\begin{cases} T_I = \dfrac{Z_I X_I \times (N \times B_{pp}(n+1) + \varepsilon)}{Z_I X_I + N_P Z_P X_P + N_B Z_B X_B} \\ T_P = \dfrac{Z_P X_P \times (N \times B_{pp}(n+1) + \varepsilon)}{N_P Z_P X_P + N_B Z_B X_B} \\ T_B = \dfrac{Z_B X_B \times (N \times B_{pp}(n+1) + \varepsilon)}{N_P Z_P X_P + N_B Z_B X_B} \end{cases}$$

These "target bits" therefore take into account the accumulated error of the previous GOP. This error is as it were reapportioned over the images of the following GOP for calculation of the target bits.

The next step 104 carries out an a posteriori check of the risks of violation of the virtual buffer, readjusts the "target bits" accordingly and calculates the initial quantization interval for the next image to be coded.

Thus, this step carries out an updating of the VBV model by calculating the VBV_fullness state. This buffer state makes it possible firstly to insert padding so as to avoid saturation of the buffer of the decoder. Secondly, the "target bit" may perhaps be readjusted (the readjustment procedure does not form the subject of this patent) and the initial quantization interval for the next image to be coded is calculated.

$$Ec(n)=Bpp(n-\tau)-Dc(n)$$

$$VBV\_fullness(n)=VBV\_fullness(n-1)+Bpp(n)-[CC(n)+B(n)]-Ec(n)$$

CC(n)+B(n) represents the cost of the image CC(n) to which is added a padding volume B (n) corresponding to the number of bits (for example 0s) which are entered into the buffer of the coder at the same time as this image n.

If VBV_fullness(n)>VBV_size−Bpp(n+1), the padding volume B(n) is then modified such that:

$$B(n)=VBV\_fullness(n)-(VBV\_size-Bpp(n+1))$$

The variation in the fill factor of the buffer is $$VBV\_fullness(n)=VBV\_fullness(n)-B(n)$$

The initial quantization intervals are calculated:
QIinit=XI/TI,
QPinit=XP/TP,
QBinit=XB/TB.

Step 104 then loops back to the initial step 101.

It should be noted that the concept of virtual buffer and VBV_offset is implicitly related to the fact that the measurement of bit rate at the output of the coder at the instant n is compared with the value Bpp from the instant n−τ. The offset in the virtual buffer is then adjusted by feeding the discrepancy between these two items back into the calculation of the state VBV_fullness. It is this simple feedback loop which ensures control of the position of the virtual buffer.

Applications relating to digital television, the transmission of a bundle of programmes, that is to say the simultaneous transmission of several video sources for example in satellite transmission or the sharing of a transponder channel by video sources utilizes statistical multiplexing. The video data are compressed and multiplexed for packwise transmission over this channel.

They also relate to DVD recordings using multipass encoding. A first pass makes it possible to determine the complexity of the images for the whole film. A second pass makes it possible, starting from a prescribed mean bit rate, to allocate a bit rate to each image as a function of this complexity. The quality of the images is thus constant for the same volume of data.

What is claimed is:

1. Process for coding digital data of a video image sequence effecting image compression of this data and regulation of the bit rate at the output of the coder by way of a regulating loop acting on a quantization interval for the data to be coded, storage in a buffer of the data output by the coder for its transmission over a channel at a variable bit rate to a buffer of a decoder, a tagging of this data so as to guarantee a constant time $\tau$ between the instant of storage of an image in the buffer of the coder and the instant of output of this image from the buffer of the decoder, characterized in that the bit rate regulation in respect of the image at the instant n is performed as a function of a bit rate prediction in respect of the transmission channel for the instant n+$\tau$, and in that the regulation is performed within the limits of a virtual buffer defined by a top address and a bottom address in the buffer of the coder, the top address or offset of the virtual buffer changing with respect to the top address of the buffer of the coder, starting from a time $\tau$ before the variation of the transmission bit rate at the output of the buffer of the coder, depending on a value corresponding to the bit rate variation multiplied by the time $\tau$.

2. Coding process according to claim 1, characterized in that the size of the virtual buffer is calculated in such a way as to be proportional, at least over a range of variation of the bit rate, to the output bit rate from the coder, the change from the size corresponding to the old bit rate up to that corresponding to the new bit rate taking place continuously from the time $\tau$ before the variation in the transmission bit rate.

3. Coding process according to claim 1, characterized in that the transmission bit rate predicted for the instant n+$\tau$ is calculated as a function of the mean complexity of the images preceding this image over the duration of a GOP (group of pictures).

4. Coding process according to claim 1, characterized in that the modelling of the virtual buffer is carried out by coding each image in such a way as to supply a bit rate at the input of the buffer corresponding to the bit rate allocated at the output of the buffer $\tau$ instant after.

5. Coding process according to claim 4, characterized in that the model of the virtual buffer is updated a posteriori by incorporating the error between the output bit rate and the bit rate allocation allotted $\tau$ instant before.

6. Process according to claim 1, characterized in that the maximum size of the virtual buffer is that of the buffer of the decoder.

7. Process according to claim 1, characterized in that the top and bottom limits of the range of variation of the bit rate at the output of the coder correspond to a positioning of the virtual buffer at the top and bottom boundaries of the physical buffer.

8. Process according to claim 1, characterized in that the regulation in respect of an image n+1 is performed on the basis of a target bit or number of targeted bits in respect of this coding and of an initial quantization interval, the target bit being calculated from the setting for the expected channel bit rate at the output of the coder in respect of image period n+$\tau$.

9. Coding process according to claim 8, characterized in that account is taken of the type of image coding, intra, predictive or bidirectional and of the values of predetermined constants of proportion in order to calculate the value of the target bit.

10. Coding process according to claim 8, characterized in that the coding of an image belonging to a GOP (group of pictures) at the instant n is performed by incorporating the error between a target bit calculated for this image and the cost of coding the image, this error being accumulated at the level of the previous GOP.

11. Process for transmitting data from several video sources effecting for each source a coding of this data according to claim 1 in order to transmit it at a variable bit rate over a given transmission channel, characterized in that it effects, for each source, a bit rate allocation $\tau$ instant before the actual bit rate of this source over the channel, depending on the channel available bit rate and on measurements of complexity of the previous images from the set of video sources.

* * * * *